United States Patent [19]

Hirota

[11] Patent Number: 5,003,380
[45] Date of Patent: Mar. 26, 1991

[54] IMAGE READING APPARATUS HAVING PLURAL LINE IMAGE SENSOR CHIPS

[75] Inventor: Yoshihiko Hirota, Osaka, Japan

[73] Assignee: Minolta Camera Kabushiki Kaisha, Osaka, Japan

[21] Appl. No.: 214,609

[22] Filed: Jul. 1, 1988

[51] Int. Cl.⁵ .................... H04N 1/46; H04N 1/04
[52] U.S. Cl. ...................... 358/75; 358/461
[58] Field of Search ............ 358/282, 284, 285, 447, 358/461, 482, 483, 494, 75

[56] References Cited

U.S. PATENT DOCUMENTS

| | | | |
|---|---|---|---|
| 4,424,590 | 1/1984 | Ozawa | 382/68 |
| 4,532,551 | 7/1985 | Kurata et al. | 358/293 |
| 4,617,596 | 10/1986 | Yoshida et al. | 358/280 |
| 4,667,250 | 5/1987 | Murai | 358/283 |
| 4,682,216 | 7/1987 | Sasaki et al. | 358/284 |
| 4,692,812 | 9/1987 | Hirakara et al. | 358/293 |
| 4,700,236 | 10/1987 | Abe | 358/284 |
| 4,734,787 | 3/1988 | Hayashi | 358/293 |
| 4,742,240 | 5/1988 | Yamanishi et al. | 358/293 |
| 4,760,466 | 7/1988 | Nakamura | 358/280 |
| 4,776,031 | 10/1988 | Mita | 358/293 |
| 4,821,110 | 4/1989 | Murakami | 358/293 |
| 4,866,512 | 9/1989 | Hirosawa et al. | 358/494 |
| 4,873,570 | 10/1989 | Sizuki et al. | 358/75 |
| 4,945,405 | 7/1990 | Hirota | 358/80 |

Primary Examiner—James J. Groody
Assistant Examiner—Yen Vu
Attorney, Agent, or Firm—Burns, Doane, Swecker & Mathis

[57] ABSTRACT

An image reading apparatus having a line image sensor for line scanning a document is disclosed. The line image sensor is comprised of plural sensor chips aligned in the main scan direction thereof each of which has an output terminal for outputting each image signal obtained thereby. The image reading apparatus provides plural analogue to digital conversion means for converting respective analogue image signals outputted from respective image sensor chips into digital data, respectively, plural memory means for memorizing the digital data and an output means for reading said digital data from said plural memory means parallel and for outputting those digital data having been read serially.

13 Claims, 16 Drawing Sheets

Spectro sensitivity characteristic (Ta=25°C)

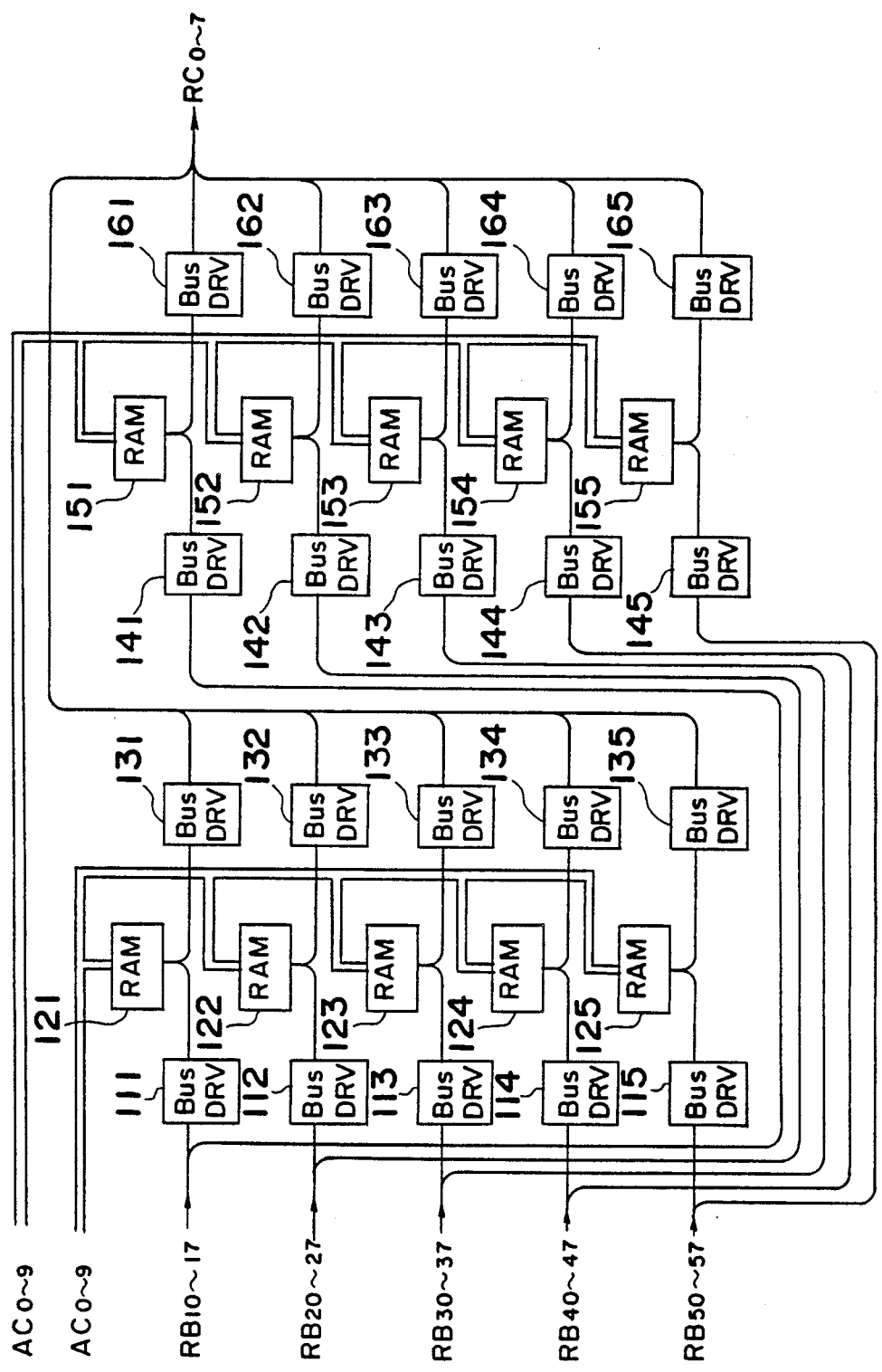

IMAGE READING APPARATUS HAVING PLURAL LINE IMAGE SENSOR CHIPS

BACKGROUND OF THE INVENTION

1. Field of the Invention

The present invention relates to an image reading apparatus providing a line image sensor for line scanning a document.

2. Description of the Prior Art

The color CCD (charge coupled device) image sensor of contact type is widely used for the color image reading apparatus. An image of a document is dissolved into plural light components (usually three primary color red (R), green (G) and blue (B) components) and those light components are transduced to color data by photo-electric transducers, respectively. Then, respective color data is converted into digital data. These digital data are binarized according to a predetermined method such as the dither method after shading correction to them is performed. The binarized data are outputted to an external device such as a printer.

The CCD sensor of contact type has a limitation with respect to the scanning speed thereof and, accordingly, it is impossible to read a document faster than the limitation. A time interval necessary for reading a document is increased as the integration density of the CCD image sensor is increased.

In a highly integrated CCD image sensor, plural CCD sensor chips are arranged alternatively along the lengthwise direction of the CCD image sensor and each chip provides a signal output terminal. In a conventional CCD image sensor, respective chips are driven serially in the order of alignment of them and respective output signals from them are transmitted, via analogue switches, to a single signal line.

According to this conventional signal processing, it is difficult to speed up the reading speed of a document image.

SUMMARY OF THE INVENTION

An essential object of the present invention is to provide an image reading apparatus being able to speed up the reading speed of a document image.

Another object of the present invention is to provide an image reading apparatus having a line image sensor of contact type comprised of plural image sensor chips in which image signals obtained by respective image sensor chips can be processed parallel.

In order to accomplish these objects, according to the present invention, there is provided an image reading apparatus having an image reading means for line scanning an image of a document to output an analogue image signal, said image reading means including a line sensor which is comprised of plural line sensor chips being aligned along the lengthwise direction of said line sensor, each of said plural line sensor chips including a plurality of image sensing devices being arranged linearly and having an output terminal for outputting an analogue image signal which includes output signals from said image sensing devices, plural analogue to digital conversion means for converting said analogue image signals obtained by said line sensor chips into digital image signals, respectively each of which is connected to respective output terminal of said plural line sensor chips, plural memory means for memorizing digital image signals converted by said analogue to digital conversion means each of which is provided for each of said line sensor chips and an output means for reading said digital image signals memorized respective memory means in the order of alignment of said plural line sensor chips at different timings so as to be able to output digital image signals belonging to the same scan line serially.

According to the present invention, image signals obtained by individual image sensor chips are stored into respective memory means parallel and image signals stored in respective memory means are read out at different timings so as to form one scan line data. Then, image signals forming one scan line data are outputted serially.

According to another aspect of the present invention, there is provided an image reading apparatus having an illuminating means for illuminating a document an image reading means for reading an image of the illuminated document by transducing the light reflected from the document into electric signals, said image reading means being comprised of plural CCD line sensor chips arranged in the main scanning direction each of which has a signal output terminal, a scanning means for line scanning said document by moving said document and image reading means relatively in the subscan direction, a driving means for driving said CCD line sensor chips parallel to output analogue image signals from respective signal output terminals of said plural line sensor chips, plural analogue to digital conversion means for converting analogue image signals into digital image signals each of which is provided for each CCD line sensor chip, plural memory means for memorizing said digital image signals converted by said analogue to digital conversion means each of which is provided for each CCD line sensor chip and an output means for outputting said digital image signals on the same scan line by reading said digital image signals from said plural memory means in the order of alignment of said CCD line sensor chips at timings different from each other.

According thereto, a document is scanned by the CCD line sensor with plural CCD image sensor chips and image signals obtained by respective CCD image sensor chip are processed parallel to those of other CCD image sensor chips.

BRIEF DESCRIPTION OF DRAWINGS

These and other objects and features of the present invention will become more apparent when the preferred embodiment of the present invention is described in detail with reference of accompanied drawings in that;

FIG. 14 is a block diagram of a parallel to serial converting circuit shown in FIG. 7;

DETAILED DESCRIPTION OF THE PREFERRED EMBODIMENT (a) Compositions of CCD line image sensor and image reading apparatus FIG. 1 shows essential elements of a color image reading apparatus according to the present invention.

Figure 1:
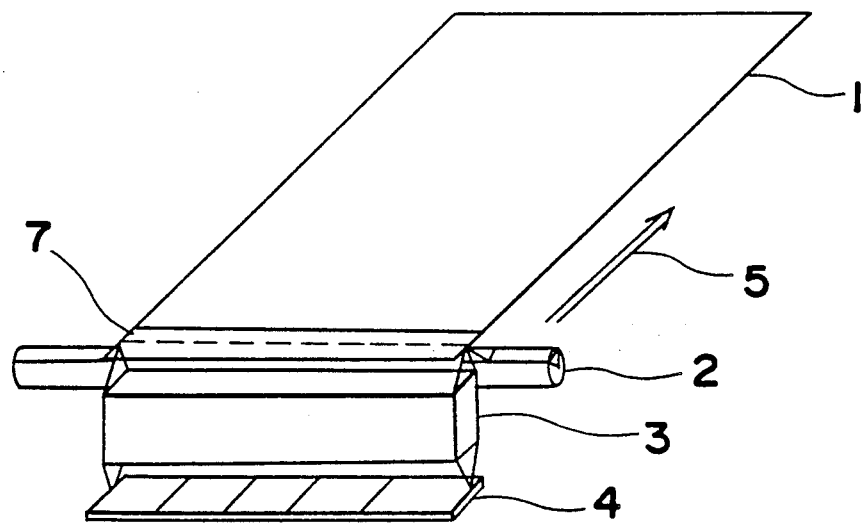
FIG. 1 is a schematic perspective view of a line scanning system of an image reading apparatus according to the present invention.

A document 1 is illuminated linearly by a light source 2 such as a fluorescent lamp which emits a light having a spectral distribution including light components of red (R), green (G) and blue (B). The light reflected from the surface of the document 1 is focused linearly on a light receiving surface of a CCD line image sensor 4 (hereafter, referred to CCD sensor) at equal magnification by a rod lens array 3.

An optical scanning system including the light source 2, rod lens array 3 and CCD sensor 4 is moved in a direction indicated by an arrow 5 by a driving means (not shown) in order to line scan the document 1 and light information obtained by the line scan is transduced into electric image signals by CCD sensor 4. CCD sensor 4 is a CCD line sensor of contact type with built-in memory which dissolves the light information into three primary colors of R, G and B and transduces respective primary color components into electric signals.

Figure 2:
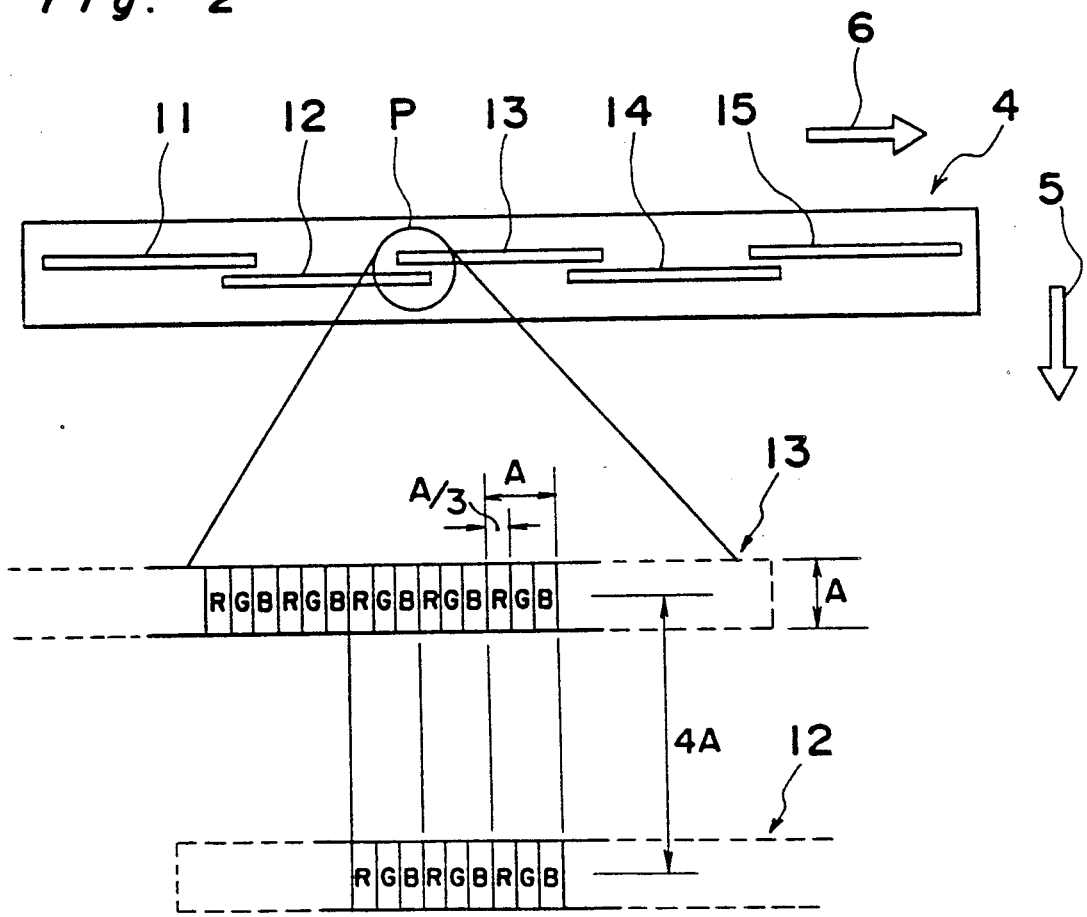
FIG. 2 is a schematic plan view of a CCD line image sensor including an enlarged view of a part thereof.

FIG. 2 shows a schematical plan view of CCD sensor 4 and partially enlarged view of a portion encircled by P.

CCD sensor 4 is comprised of five CCD sensor chips 11 through 15 each of which has effective reading picture elements of 3072 dots. These CCD sensor chips 11 through 15 are arranged parallel and alternatively with respect to the lengthwise direction of CCD sensor 4 and formed so as to be able to read a document of A3 size with a resolution of 16 lines per mm. Each picture element of respective CCD sensor chip is divided into three portions in the lengthwise direction thereof (sometimes, referred to the main scan direction) on which three filters for primary colors R, G and B are formed by deposition, respectively.

These CCD sensor chips 11 through 15 are aligned in series in the main scan direction and alternatively with a distance 4A of four picture elements in the direction of width of CCD sensor 4 (sometimes, referred to the subscan direction). Output signals $OS_1$ through $OS_5$ from CCD sensor chips 11 through 15 are outputted parallel, as will be stated in detail later.

Figure 3:
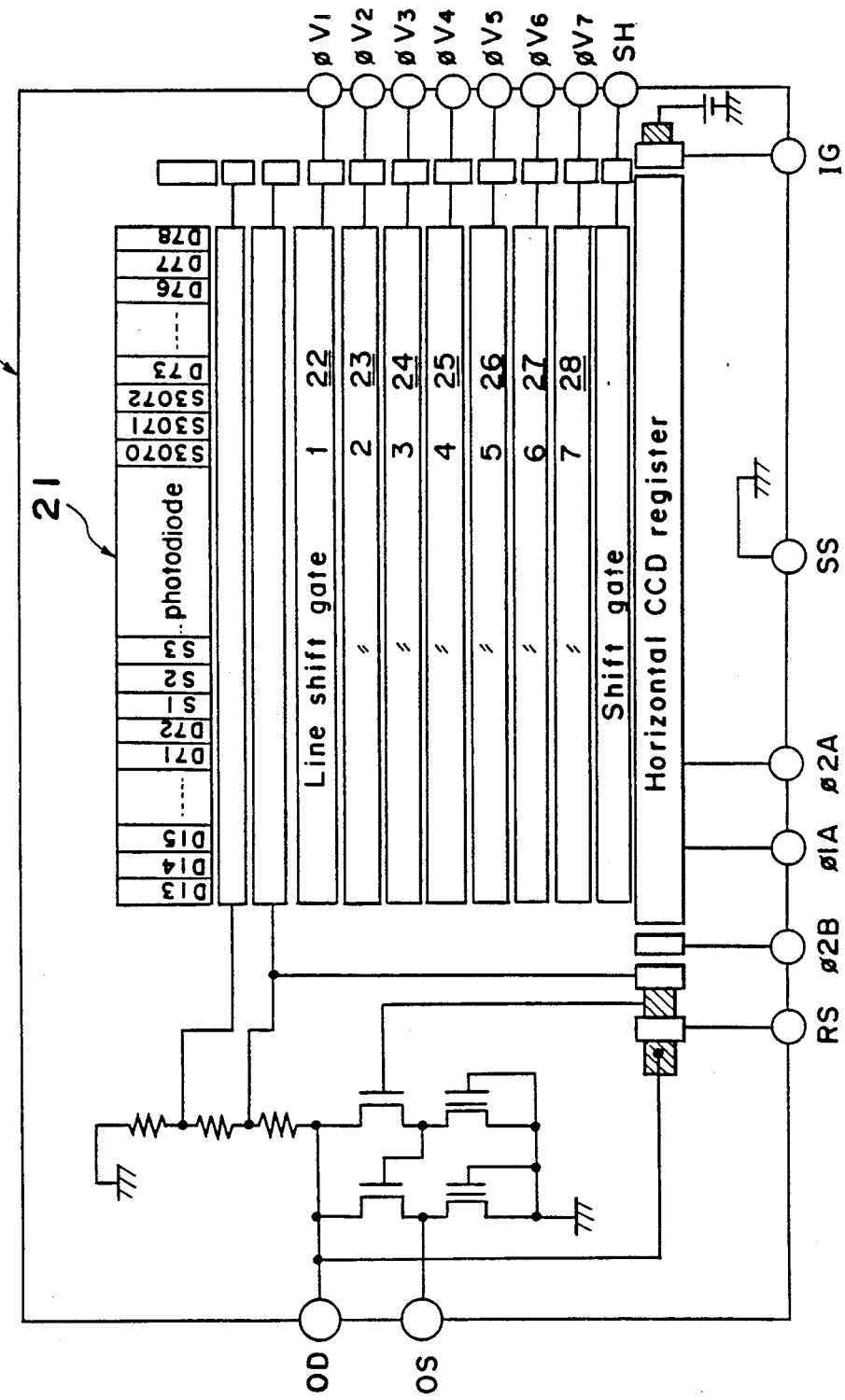
FIG. 3 is a block diagram of one of CCD sensor chips constituting the CCD line image sensor.

FIG. 3 shows a block diagram of CCD sensor chip 11. Other CCD sensor chips 12 through 15 have the composition substantially same to that of the CCD sensor chip 11.

As shown in FIG. 3, the CCD sensor chip 11 provides photodiode array 21 comprised of 3072 photodiodes aligned on a line each of which forms an effective picture element and, on the both sides of the photodiode array 21, dummy picture elements D13 through D72 and D73 through D78 are arranged, respectively. The CCD sensor chip 11 is of a type with built-in memory and provides seven shift gates 22 through 28 each of which is able to store one line data obtained thereby. These line shift gates 22 through 28 are driven by pulses $\phi V_1$ through $\phi V_7$, respectively.

As stated above, two CCD sensor chips 12 and 14 are arranged distant from three CCD sensor chips 11, 13 and 15 by the distance 4A of four picture elements when seen in the subscan direction. Accordingly, pulses $\phi V_1$ through $\phi V_7$ to be applied to line shift gates 22 through 28 of each of CCD sensor chips 12 and 14 are delayed by a time interval necessary for scanning four scan lines in the subscan direction when compared with those of each of CCD sensor chips 11, 13 and 15. This enables to obtain image data on the same scan line as a whole by CCD sensor 4. Other structures of CCD sensor chip 11 are well known to those skilled in the art and, therefore, explanation about them is abbreviated.

Figure 4:
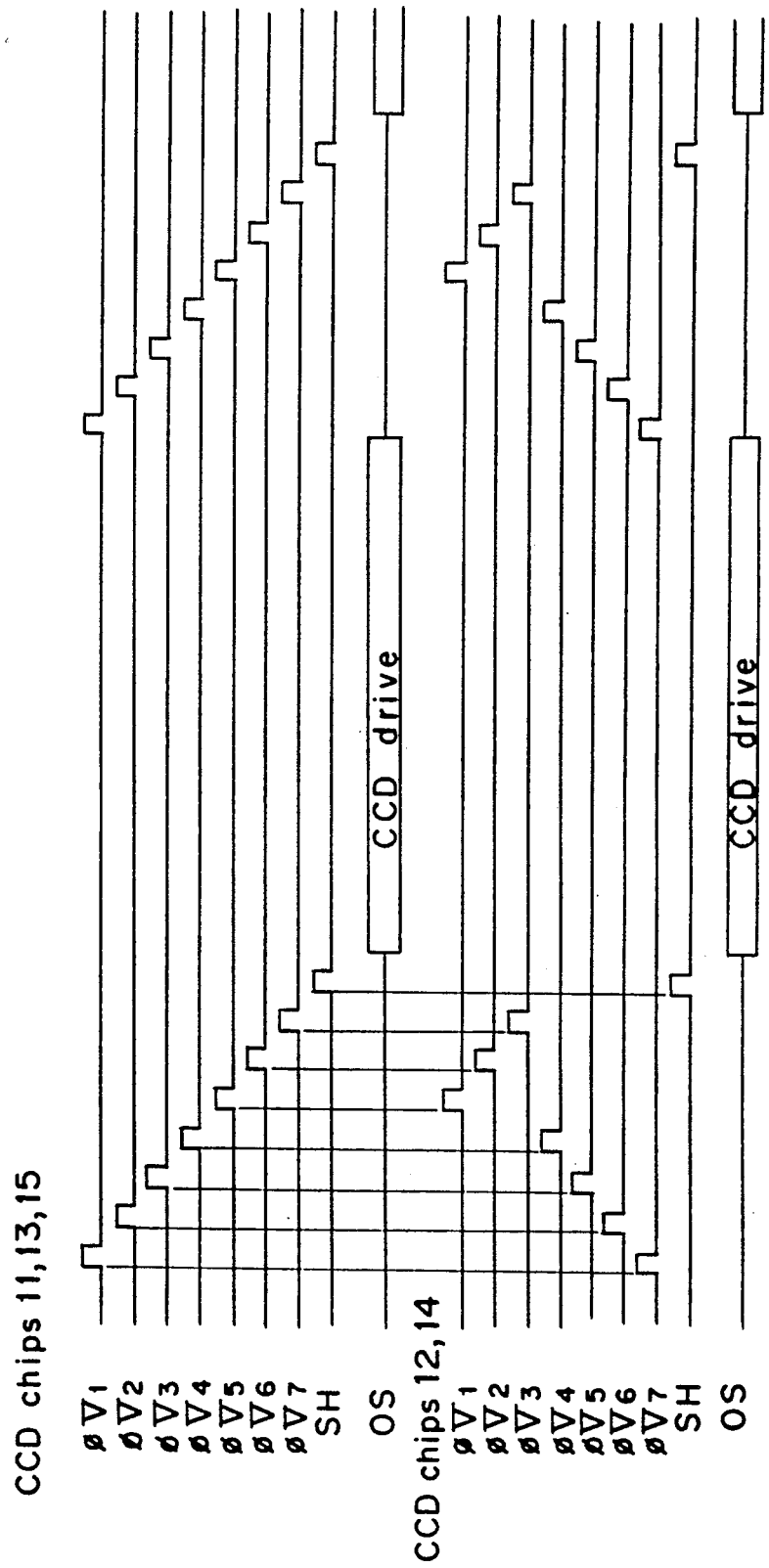
FIG. 4 is a timing chart for driving individual CCD sensor chips.

FIG. 4 shows a time chart of pulses $\phi V_1$ through $\phi V_7$. As shown clearly in FIG. 4, although all of the CCD sensor chips are driven at the same time, in parallel, each of pulses $\phi V_1$ through $\phi V_7$ with respect to each of CCD sensor chips 12 and 14 is delayed by a time interval of four pulse cycles when compared with that with respect to each of CCD sensor chips 11, 13 and 15. As the result of that, all of CCD sensor chips are deemed as if they are aligned on the same line and image signals with respect to the same scan line can be obtained from them.

Figure 5:
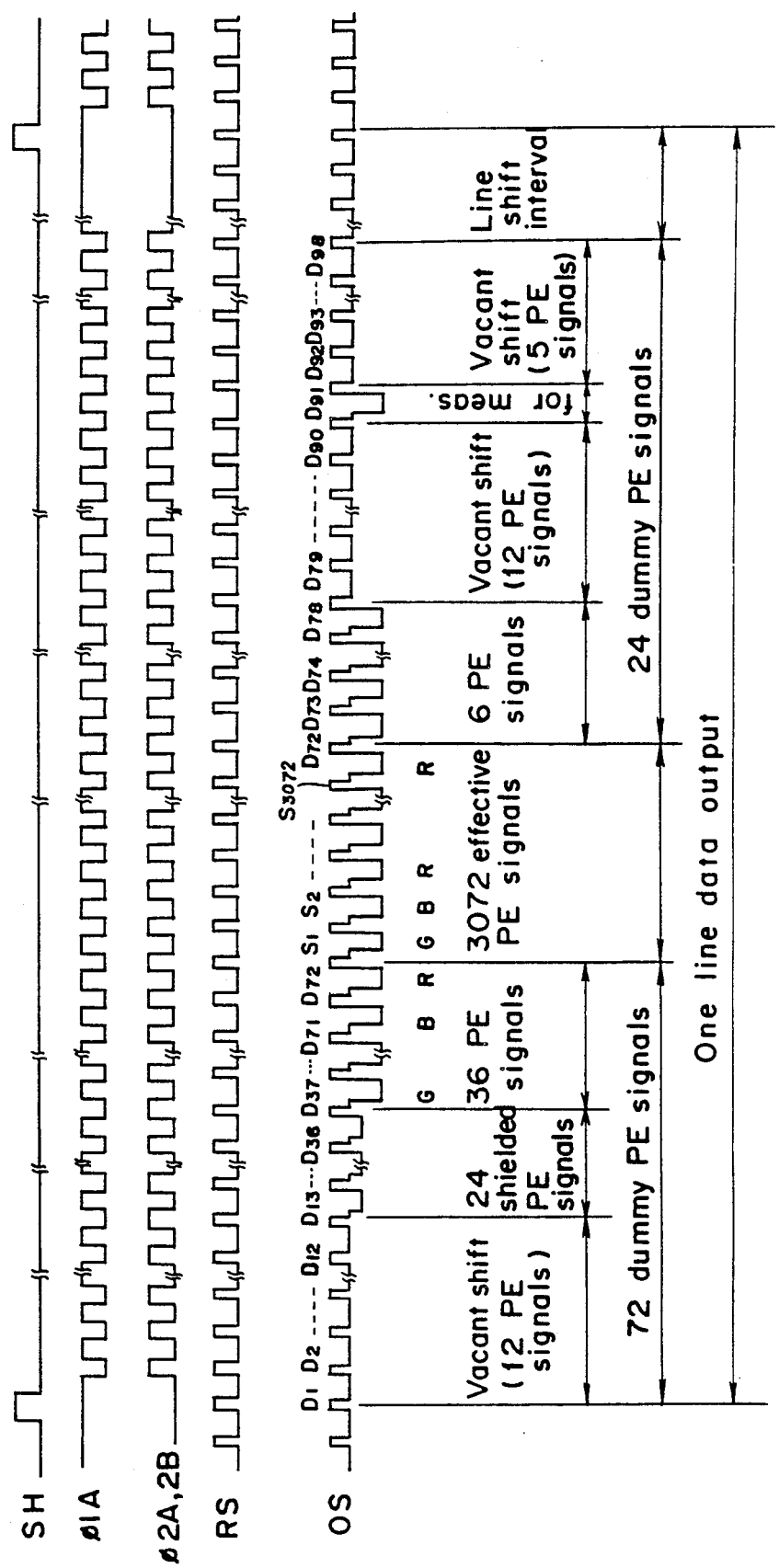
FIG. 5 is a timing chart for driving one of CCD sensor chips.

FIG. 5 shows a time chart of various pulses necessary for driving individual CCD sensor chips 11 through 15. In order to drive each CCD sensor chip, twelve pulses in sum including $\phi V_1$ through $\phi V_7$, SH, $\phi 1A$, $\phi 2A$, $\phi 2B$ and RS are applied thereto.

As is clearly shown in FIG. 5, five pulses SH, $\phi 1A$, $\phi 2A$, $\phi 2B$ and RS other than $\phi V_1$ through $\phi V_7$ are applied at same timings irrespective to the order of alignment of CCD sensor chips.

Each CCD sensor chip is started to output respective image signal when a shift pulse SH is applied thereto. When pulses $\phi 1A$, $\phi 2A$, $\phi 2B$ and RS are applied thereto, respectively, an analogue image signal including outputs from individual picture elements of each CCD sensor chip are outputted from an output terminal OS thereof in synchronous with RS pulses.

Figure 6:
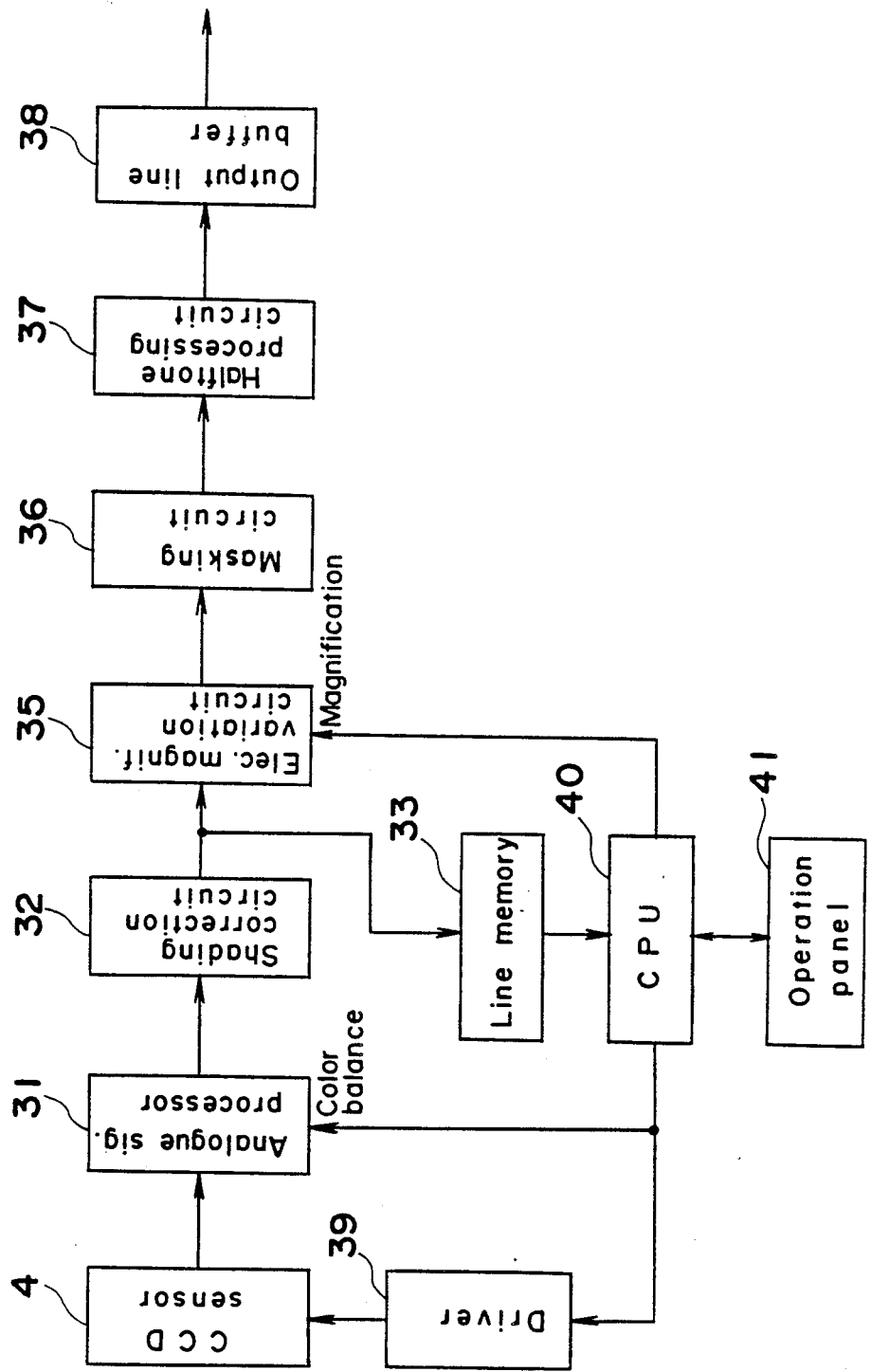
FIG. 6 is a block diagram of the image reading apparatus according to the present invention.

FIG. 6 shows a block diagram of the color image reading apparatus.

The color image reading apparatus repeats the line scan to a document three times and color information of R, G and B read by respective line scans is transformed into print data of cyan (C), magenta (M) and yellow (Y) sequentially and each color print data is outputted to an external output apparatus such as a color printer.

More concretely, CCD sensor 4 transduces light information R, G or B of one scan line of a document into a serial image signal including outputs of all picture elements and outputs it as individual picture element signals sequentially. These picture element signals are converted into digital data by an analogue to digital converter 31, respectively and each of digital data is corrected by a shading correction circuit 32. These corrected digital data are stored once into a line memory 33. Digital data stored in the line memory 33 are electrically magnified or reduced at a designated magnification by a circuit 36 for magnifying or reducing an image electrically and are processed by a masking processor 36. Then, each of digital data is binarized according to a predetermined method by a half-tone processor 37. These binary data are transmitted, via an output line buffer 38, to an external output apparatus 38 such as a printer.

Pulses SH, $\phi 1A$, $\phi 2A$, $\phi 2B$, RS and $\phi V_1$ through $\phi V_7$ for driving CCD sensor 4 are generated by a driving circuit 39. As explained previously in relation to FIG. 4., the driving circuit 39 drives the CCD sensor chips 12-15 all at the same time, but with the driving pulses with respect to each of chips 12 and 14 being delayed by four pulse signals when compared with each of chips 11, 13 and 15.

Further, CPU 40 gives timings for driving CCD sensor 4 to the driving circuit 39 and generates a signals for setting color balance to the analogue signal processor 31. Also, data regarding the magnification set by an operation panel. 41 is sent from CPU 40 to the magnification varying circuit 35.

(b) Digitalizing process and color balance correction for image signals

Figure 7:
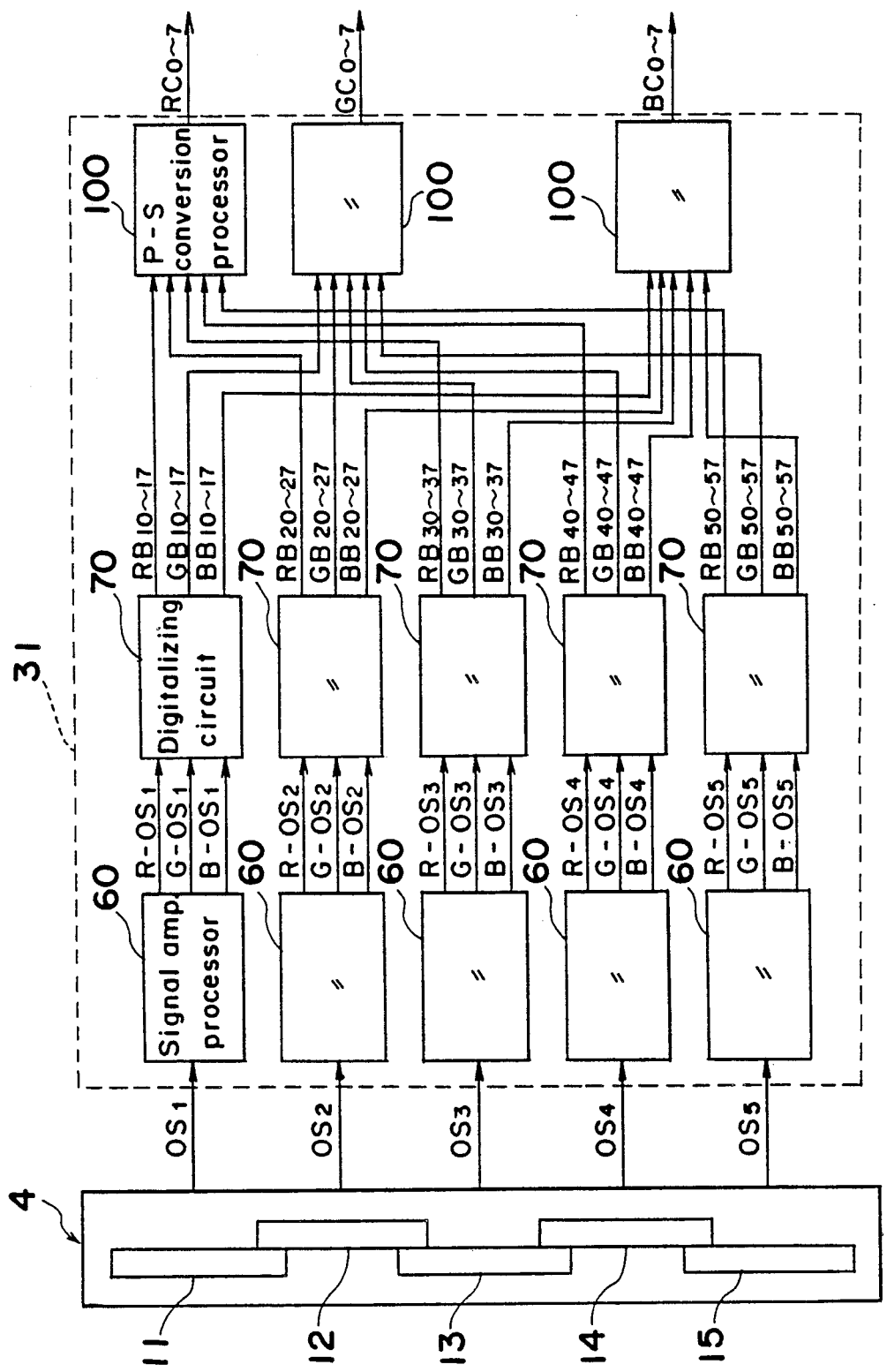
FIG. 7 is a block diagram of an analogue signal processing circuit according to the present invention.

As shown in FIG. 7, output signals $OS_1$ to $OS_5$ from individual CCD sensor chips 11 to 15 are input to corresponding signal amplification processing circuits 60 provided in the analogue signal processor 31 and each of output signals $OS_1$ to $OS_5$ is dissolved into three primary color signals thereby.

The reason why respective output signals $OS_1$ to $OS_5$ are not amplified directly is that each of them includes a relatively high off-set voltage as will be explained later.

As stated referring to FIG. 5, each of output signals $OS_1$ to $OS_5$ of CCD sensor chips 11 to 15 is outputted in synchronous with each of pulses $RS_1$ to $RS_5$ applied to each of CCD sensor chips 11 to 15 during one time interval set for outputting one line data.

Figure 8:
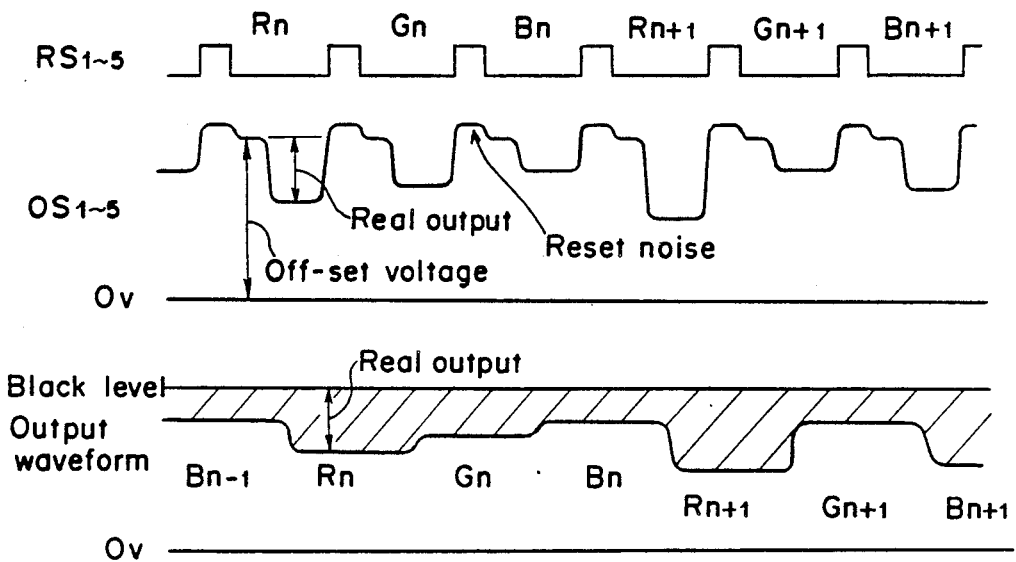
FIG. 8 shows waveforms of an output signal of one of CCD sensor chips and a shaped signal thereof.

As shown in FIG. 8, each of effective picture element signals contained in each of output signals $OS_1$ to $OS_5$ falls by an amplitude proportional to the intensity of incident light, but contains a reset noise and an off-set voltage of about 5 to 6 volts. The maximum amplitude of the picture element signal, namely the saturated voltage of the output signal is about 1 volt. On the other hand, signals indicating a voltage of black level which gives the off-set voltage are outputted from optically shielded picture elements $D_{13}$ through $D_{36}$ of each CCD sensor chip before effective picture element signals are outputted (see FIG. 5).

Since the off-set voltage is too high in comparison with the amplitude of each effective picture element signal, it is difficult to digitalize output signals $OS_1$ to $OS_5$ of CCD sensor chips 11 to 15 directly. In order to avoid this problem, the signal amplification processing circuit 60 is prepared in the present preferred embodiment.

Figure 9:
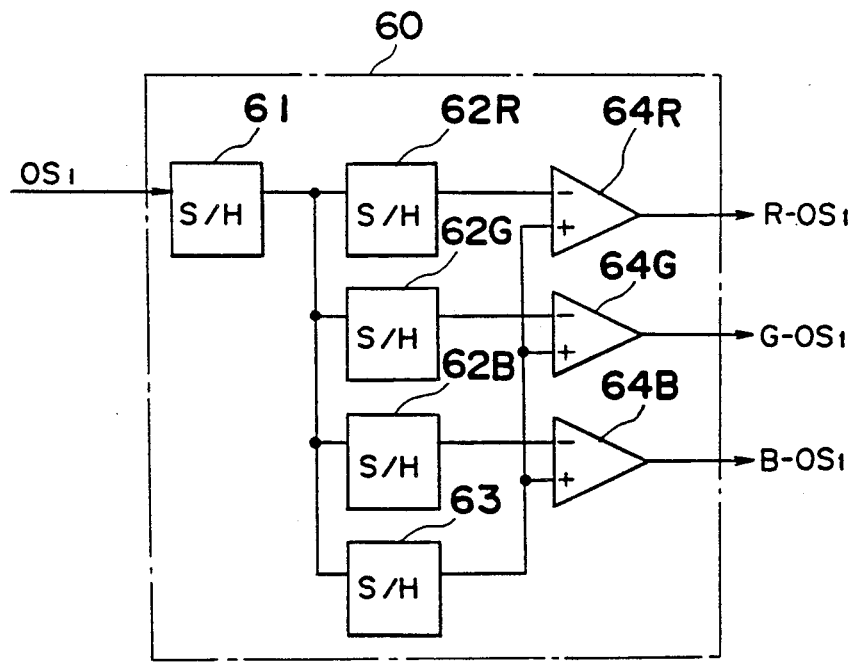
FIG. 9 is a block diagram of the signal amplifying and processing circuit shown in FIG. 7.

FIG. 9 shows a composition of the signal amplification processing circuit 60. Although only signal amplification processing circuit 60 for the output signal $OS_1$ of the CCD sensor chip 11 is shown in FIG. 9, the same circuit is provided for each of other CCD sensor chips 12 to 15.

Figure 10:
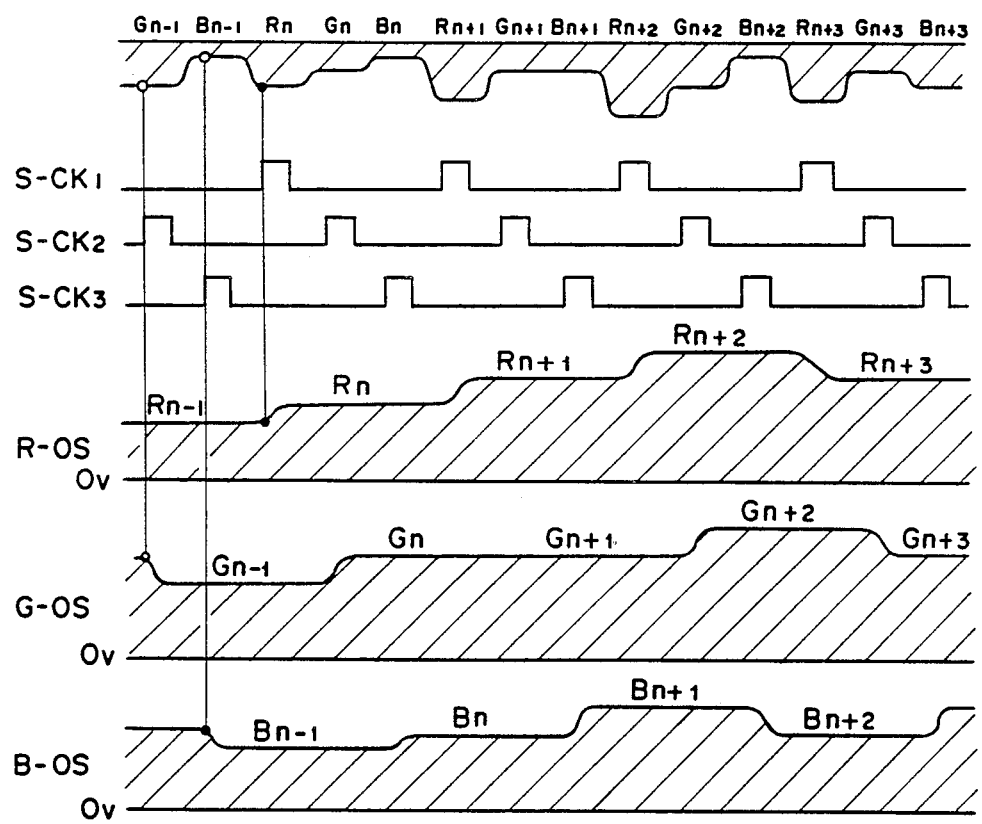
FIG. 10 is a time chart showing wavefroms of R, G and B output signals outputted from the signal amplifying and processing circuit shown in FIG. 9.

Output signal $OS_1$ input into the signal amplificaton processing circuit 60 is shaped in waveform thereof by a sample and hold circuit 61 in order to remove respective reset noises contained therein (see the waveform indicated by $R_n$, $G_n$, $B_n$ or the like in FIG. 8). Then the shaped output signal $OS_1$ including dissolved color signals of R, G and B serially is transformed into parallel signals by sample and hold circuits 62R, 62G and 62B. As shown in FIG. 10, clock pulses S-$CK_1$, S-$CK_2$ and S-$CK_3$ are applied to the sample and hold circuits 62R, 62G and 62B, respectively and each of them samples corresponding color signal at "high" level of the clock pulse and holds it at "low" level of the same. One more sample and hold circuit 63 is provided for holding the level of the output of the light shielded picture element (the voltage of the black level) during every output of one scan line data. Each of amplifying circuits 64R, 64G and 64B amplifies the difference between the corresponding color signal held thereby and the black signal level held by the sample and hold circuit 63. Namely, as shown in FIG. 10, each amplitude of color signals is amplified about three times in the positive direction after removing the off-set voltage to obtain individual amplified image signals R-$OS_1$, G-$OS_1$ and B-$OS_1$.

Figure 11:
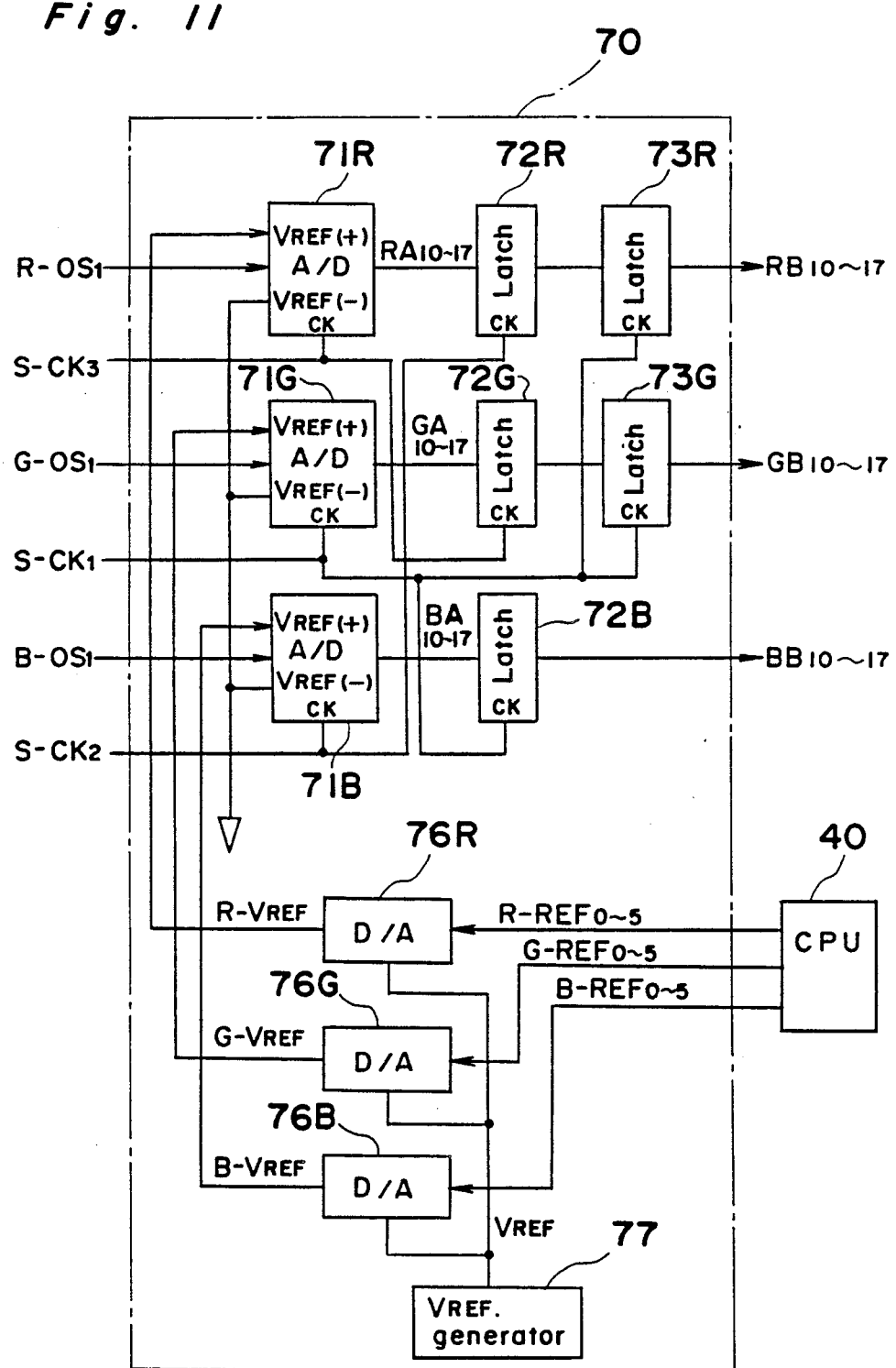
FIG. 11 is a block diagram of a digitalizing circuit shown in FIG. 7.
Figure 12:
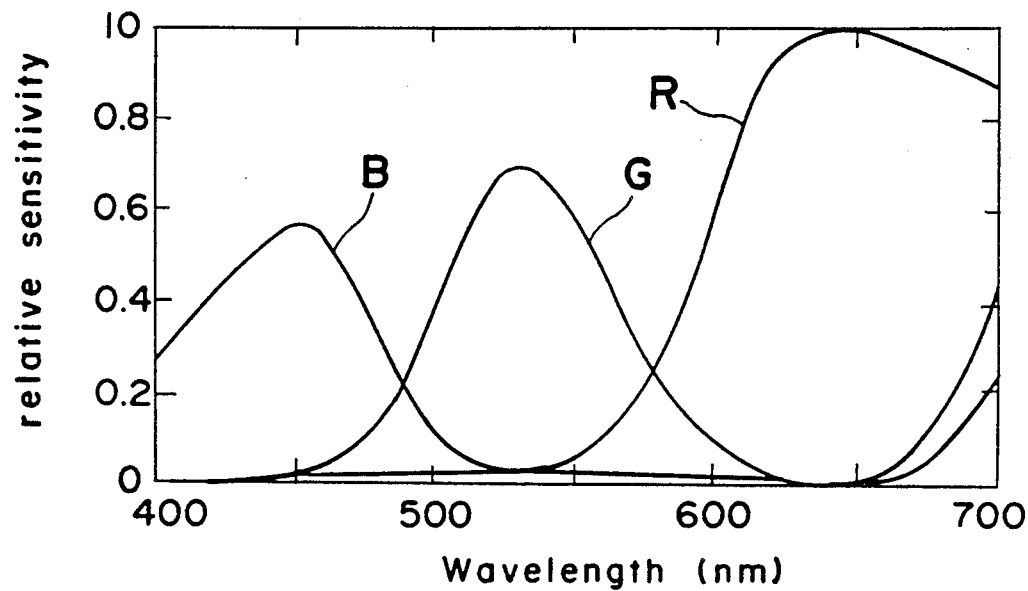
FIG. 12 is a graph showing spectral sensitivity of the CCD sensor to white light.
Figure 13:
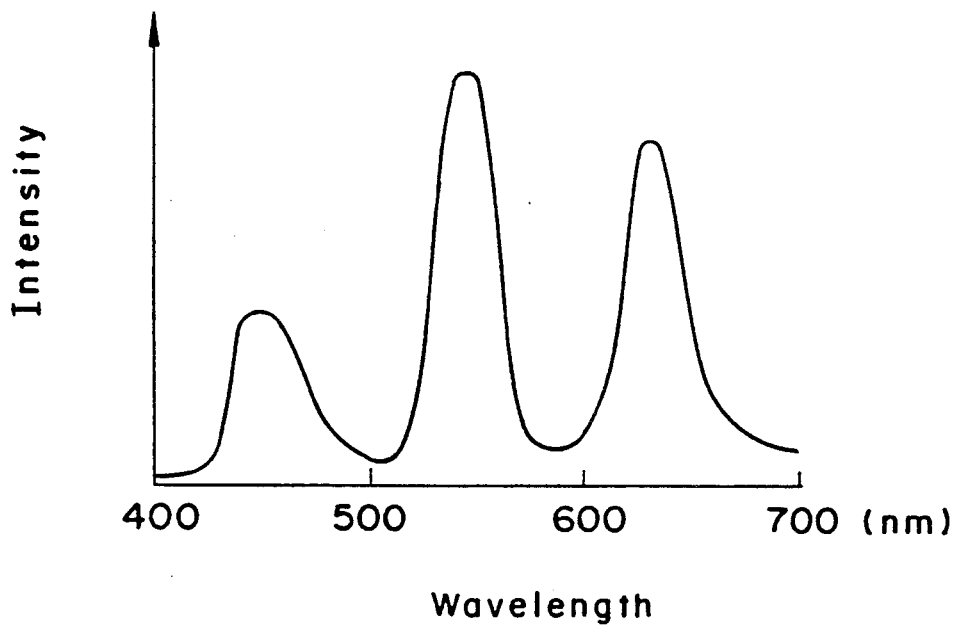
FIG. 13 is a graph showing spectral distribution of a light source.

These amplified image signals R-$OS_1$, G-$OS_1$ and B-$OS_1$ are input into a digitalizing processing circuit 70 provided in the analogue signal processing circuit 31. The digitalizing processing circuit 70 has three analogue to digital converters 71R, 71G and 71B, as shown in FIG. 11. Each of image signals R-$OS_1$, G-$OS_1$ and B-$OS_1$ is transformed into digital data $RA_{10 \sim 17}$, $GA_{10 \sim 17}$ or $BA_{10 \sim 17}$ of 8 bits in the order of clock pulses S-$CK_3$, S-$CK_1$ and S-$CK_2$.

Upon this transformation, the color balance correction is executed as will be explained later.

Digital data $RA_{10} \sim RA_{17}$, $GA_{10} \sim GA_{17}$ and $BA_{10} \sim BA_{17}$ of A/D converters 71R, 71G and 71B are shifted in their phases by one third of the period of the clock pulse.

Digital data $RA_{10} \sim RA_{17}$, $GA_{10} \sim GA_{17}$ and $BA_{10} \sim BA_{17}$ are latched by latch circuits 72R, 72G and 72B at timings of clock pulses S-$CK_2$, S-$CK_3$ and S-$CK_1$, respectively and, further, output digital data from the latch circuits 72R and 72G are latched respectively by latch circuits 73R and 73G at the timing of the clock S-$CK_1$.

Accordingly, digital data $RB_{10} \sim RB_{17}$, $GB_{10} \sim GB_{17}$ and $BB_{10} \sim BB_{17}$ outputted from the latch circuits 73R, 73G and 73B have the same phase with each other.

The color balance correction by each of the A/D converters 71R, 71G and 71B is performed by setting individual upper limits $V_{REF(+)}$ for respective A/D converters. All of lower limits for them are fixed at the voltage of the ground.

The reasons why the color balance correction is needed are that the dissolved primary color image signals do not have the same level even when a white paper of homogeneous density is read by CCD sensor 4 and that the spectral distribution of the fluorescent lamp as the light source has unequal intensities with respect to three primary colors R, G and B.

The color balance correction is performed according to the following steps.

1st step:

Upon starting the line scan, CPU 40 outputs digital data of maximum value 3F(HEX) to digital to analogue converters (D/A converter) 76R, 76G and 76B, respectively. At this stage, each of $V_{REF(+)}$ terminals of the A/D converters 71R, 71G and 71B is set at a reference voltage $V_{REF}$ generated by a standard voltage generating circuit 77. Then, CCD sensor 4 reads a white pattern of homogeneous density and digital data of dissolved color image signals of one line are stored in respective line memory 33.

2nd step:

CPU 40 reads out each of R, G and B digital data from respective line memory and determines the maximum value with respect to each of them.

3rd step:

CPU 40 determines data of 6 bits $R\text{-}REF_{0\sim 5}$ in accordance with the detected maximum values within a range wherein they are not exceeded by digital image data $RA_{10\sim 17}$, $GA_{10\sim 17}$ and $BA_{10\sim 17}$ and outputs them to digital to analogue (D/A) converters 76R, 76G and 76B, respectively.

4th step:

Each of D/A converters 76R, 76G and 76B calculates each of $R\text{-}V_{REF}$, $G\text{-}V_{REF}$ and $B\text{-}V_{REF}$ according to an equation $\{V_{REF}(X/164)\}$ wherein X is a value obtained by transforming each data of $R\text{-}REF_{10\sim 16}$, $G\text{-}REF_{10\sim 16}$ and $B\text{-}REF_{10\sim 16}$ into a decimal number. Each of $R\text{-}V_{REF}$, $G\text{-}V_{REF}$ and $B\text{-}V_{REF}$ is outputted to each of A/D converters 71R, 71G and 71B.

Thus, individual upper limits are set to A/D converters 71R, 71G and 71B, respectively.

Although the digitalizing processing circuit 70 only for the CCD sensor chip 11 is shown in FIG. 11, other image signals $R\text{-}OS_i$, $G\text{-}OS_i$ and $B\text{-}OS_i (i=2\sim 5)$ are also processed by the same circuits 70, respectively. (c) Serial output by CCD sensor The analogue signal processing circuit 31 controls CCD sensor 4 so as to output signals $OS_1$ to $OS_5$ parallel from CCD sensor chips 11 to 15 in order to read them thereinto faster. As the result of that, it becomes necessary to convert effective picture element signals included in output signals $OS_1$ to $OS_5$ having been read parallel into a serial image signal of one scan line aligned in the order of $OS_1$ to $OS_5$.

Image signal data ($RB_{10\sim 17}$, $GB_{10\sim 17}$ and $BB_{10\sim 17}$), ($RB_{20\sim 27}$, $GB_{20\sim 27}$ and $BB_{20\sim 27}$), . . . and ($RB_{50\sim 57}$, $GB_{50\sim 57}$, $BB_{50\sim 57}$) which have been digitalized in synchronous with each other (see FIG. 7) are stored into corresponding memories once, as shown in FIG. 14.

Stored image signal data are read out serially in the order of alignment of CCD sensor chips 11 to 15 in synchronous with clock pulses CK-A.

Figure 15A:
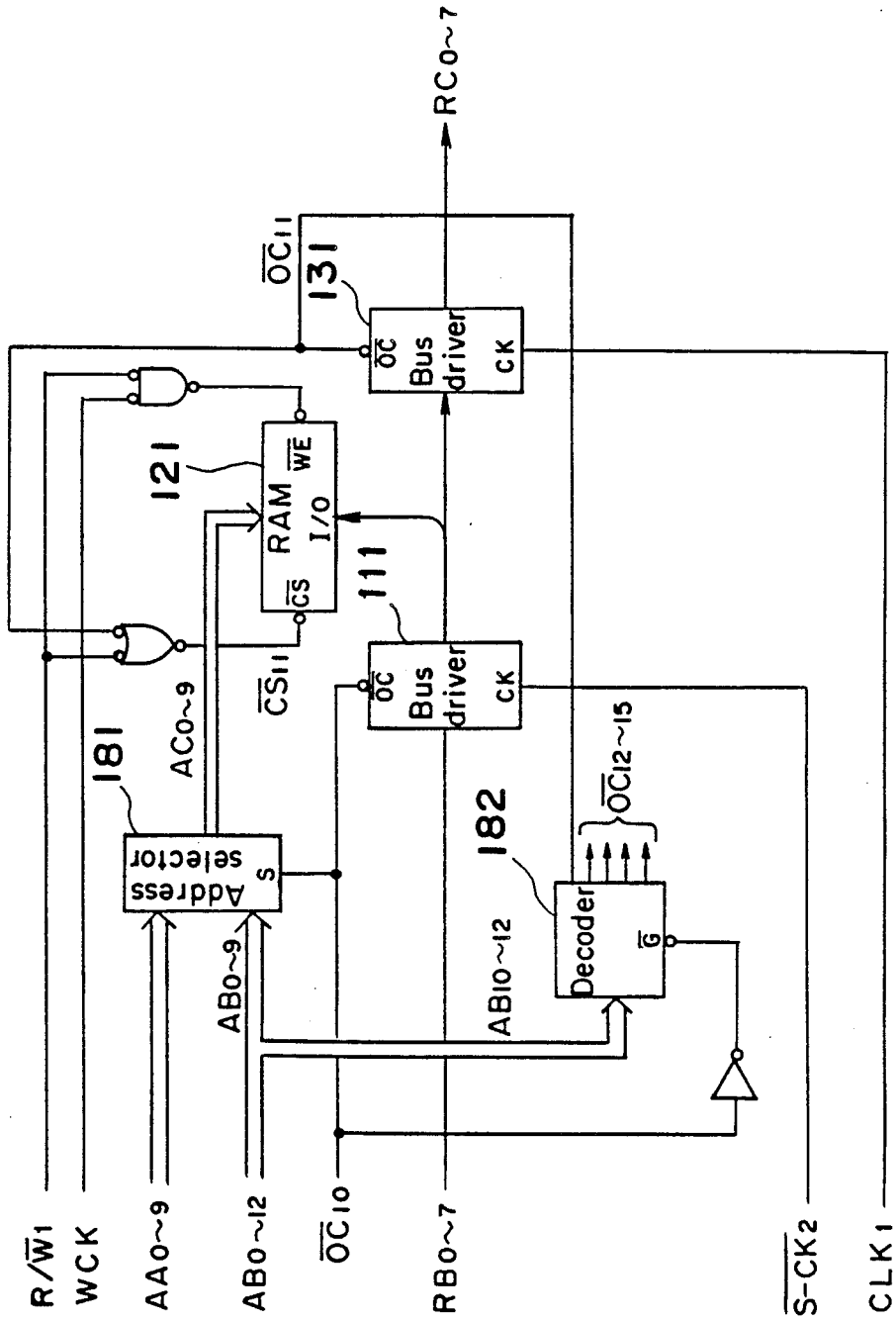
FIGS. 15(a) and 15(b) are block diagrams for showing parts of the parallel to serial converting circuit in detail, respectively.
Figure 15B:
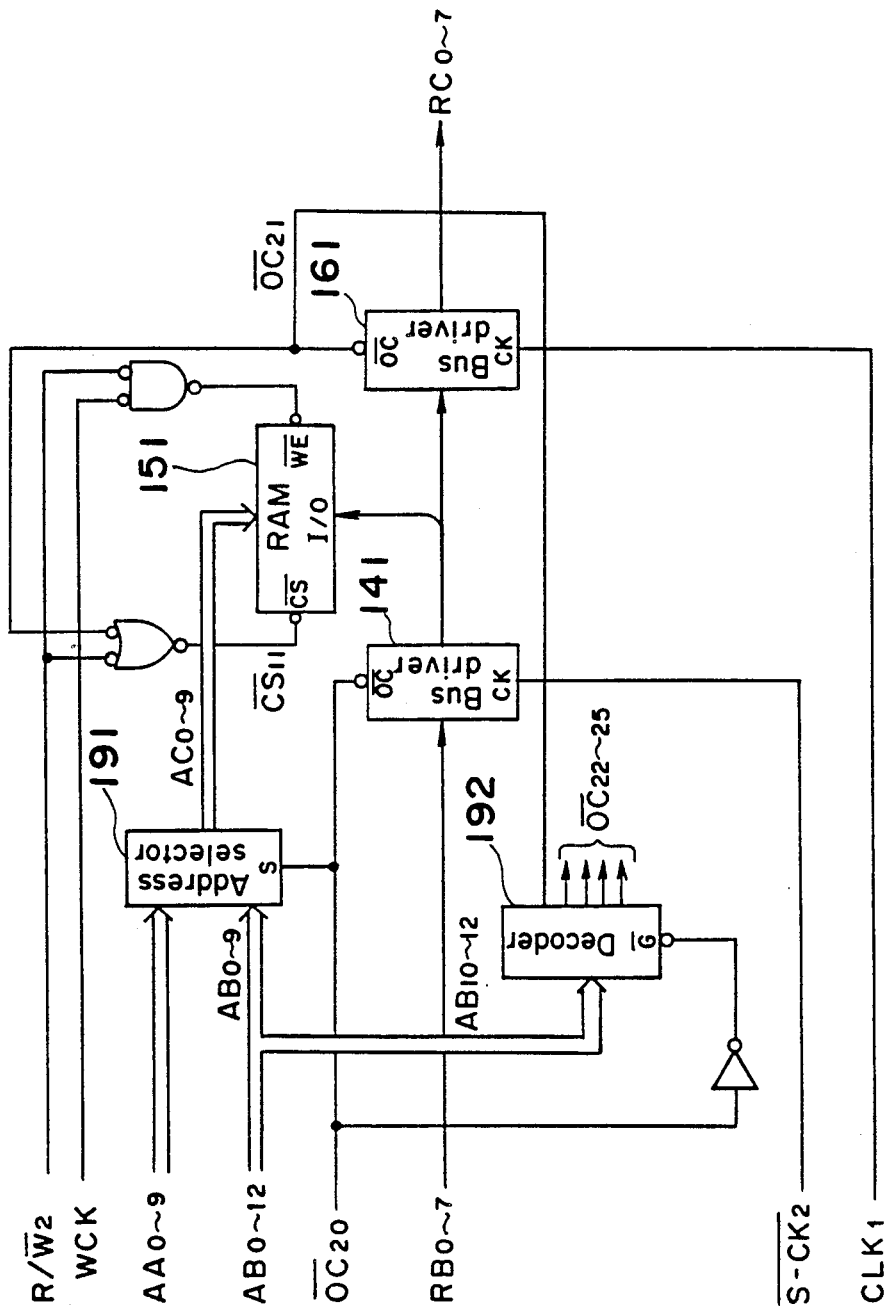
Figure 16:
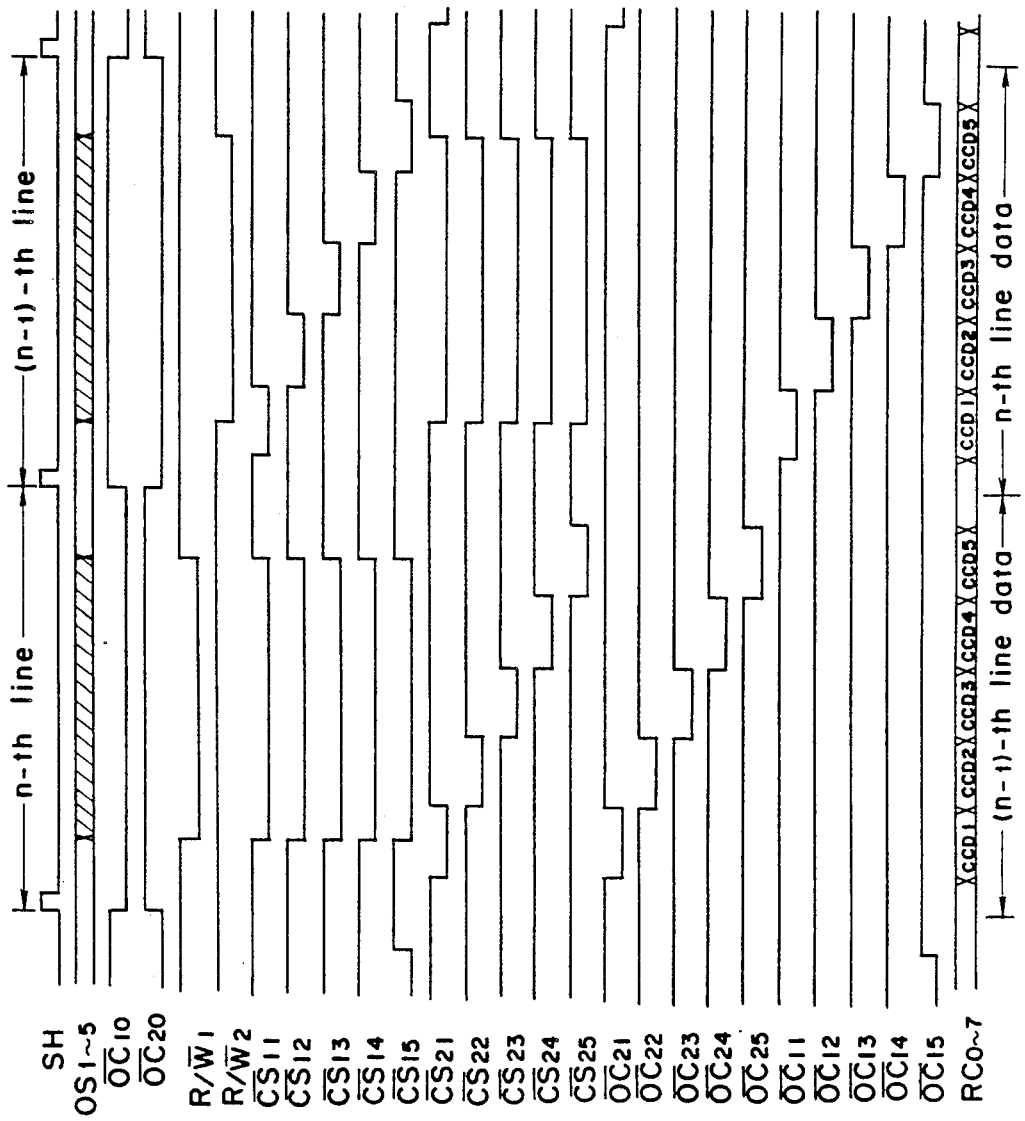
FIG. 16 is a timing chart for showing individual signals to be input into and outputted from the parallel to serial converting circuit.

FIG. 14 shows a block diagram of parallel to serial converting circuit 100 for converting parallel R image signal data $RB_{10\sim 17}$, $RB_{20\sim 27}$, $RB_{30\sim 37}$, $RB_{40\sim 47}$ and $RB_{50\sim 57}$ into a serial signal data. FIGS. 15(a) and 15(b) show a parallel to serial converting circuit for output image signal from one CCD sensor chip in detail. Further, FIG. 16 shows a time chart of the P-S converting circuit shown in FIGS. 15(a) and 15(b).

Although only the P-S converting circuit 100 for R image signal data is shown in FIG. 14, other color image signal data $GB_{10\sim 17}$, . . . , $GB_{50\sim 57}$, $BB_{10\sim 17}$, . . . , $BB_{50\sim 57}$ are also processed by the same P-S converting circuits 100, respectively.

As shown in FIG. 14, each image signal data $RB_{10\sim 17}$ from CCD sensor chip 11 is written into each of addresses $AC_{0\sim 9}$ of memories 121 and 151 via bus drivers 111 and 141. The data written into each of the memories 121 and 151 is read out through each of bus drivers 131 and 161. As will be explained in detail later, the pair of memories 121 and 151 is controlled so as to read out data from the other one of them if data is being written into another one.

Similarly, each of image signal data from $RB_{20\sim 27}$ to $RB_{50\sim 57}$ is written into corresponding pair of memories (122, 152), (123, 153), (124, 154) or (125, 155) via either one of bus drivers 112 to 115 and either one of bus drivers 122 to 125 and each of written data is read out through either one of bus drivers 132 to 135 or of bus drivers 162 to 165. Each memory has a volume of 1 KB so as to be able to store dissolved color image data obtained by one CCD sensor chip.

As shown in FIGS. 15(a) and 15(b), upon writing data into the pair of memories (for example, memories 121 and 151), signals $\overline{OC10}$ and $\overline{OC20}$ are alternatively applied to $\overline{OC}$ terminals of the bus drivers 111 and 141 whenever one scan line data has been processed and in synchronous therewith, corresponding one of them transmits signal data $RB_{10\sim 17}$ to corresponding one of the memories 121 and 151. When either one of signals $\overline{OC10}$ and $\overline{OC20}$ is dropped to "low" level, the corresponding one of the memories 121 and 151 is enabled to write every one line data by signal $R/\overline{W1}$ or $R/\overline{W2}$ and image data $RB_{10\sim 17}$ is stored into the address $AC_{0\sim 9}$ of the memory 121 or the address $AD_{0\sim 9}$ of the memory 151.

The address $AC_{0\sim 9}$ or $AD_{0\sim 9}$ is an address $AA_{0\sim 9}$ chosen by address selector 181 or 191 when the signal $\overline{OC10}$ or $\overline{OC20}$ is set at "low" level.

Upon reading data from either one of memories 121 to 125 and 151 to 155, a decoder 182 or 192 generates signals $\overline{OC11}$ to $\overline{OC15}$ or $\overline{OC21}$ to $\overline{OC25}$ for selecting bus drivers 131 to 135 or 161 to 165 sequentially, when the signal $\overline{OC10}$ or $\overline{OC20}$ is held at "high" level. When one memory is selected by either one of signals $\overline{OC11}$ to $\overline{OC15}$ or $\overline{OC21}$ to $\overline{OC25}$, data stored at the address $AC_{0\sim 9}$ or $AD_{018\,9}$ of the selected memory is read out in synchronous with clock pulses CLK1 and image data $RC_{0\sim 7}$ converted serially is outputted through the corresponding bus driver. The address $AC_{0\sim 9}$ or $AD_{0\sim 9}$ is the address $AB_{0\sim 9}$ selected by the address selector 181 or 191. Upper three bits of the address $AB_{0\sim 12}$ are assigned to select either one of bus drivers 131 to 135 and 161 to 165 serially by the decoder 182 or 192.

Similarly, G or B image signal is outputted as serial image data $GC_{0\sim 7}$ or $BC_{0\sim 7}$.

Signals $R/\overline{W1}$, $R/\overline{W2}$, $\overline{OC10}$ to $\overline{OC15}$ and $\overline{OC20}$ to $\overline{OC25}$, clocks WCK, S-CK2 and CLK1 and addresses $AA_{0\sim 9}$ and $AB_{0\sim 12}$ are generated by the driving circuit 39 shown in FIG. 6.

In FIGS. 15(a) and 15(b), each of signals $\overline{CS11}$ to $\overline{CS15}$ is an AND signal between signal $R/\overline{W1}$ and corresponding one of $\overline{OC11}$ to $\overline{OC15}$ and also, each of signals $\overline{CS21}$ to $\overline{CS25}$ is an AND signal between signal $R/\overline{W2}$ and corresponding one of $\overline{OC21}$ to $\overline{OC25}$. Each of these signals $\overline{CS11}$ to $\overline{CS15}$ and $\overline{CS21}$ to $\overline{CS25}$ is held at "low"

level for enabling corresponding one of memories 121 to 125 and 151 to 155 to read or write.

(d) Shading correction

Figure 17:
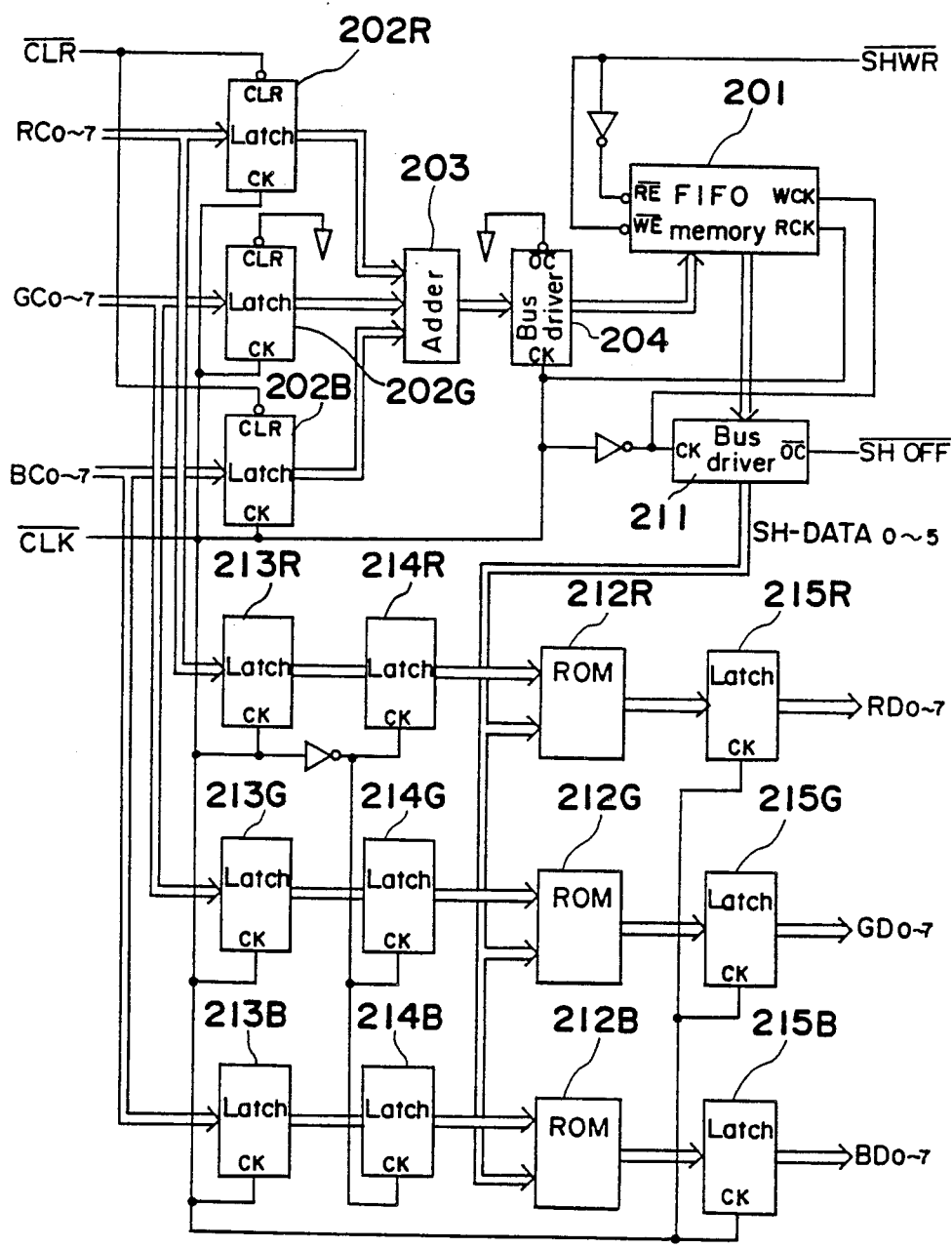
FIG. 17 is a block diagram of a shading correction circuit.
Figure 18:
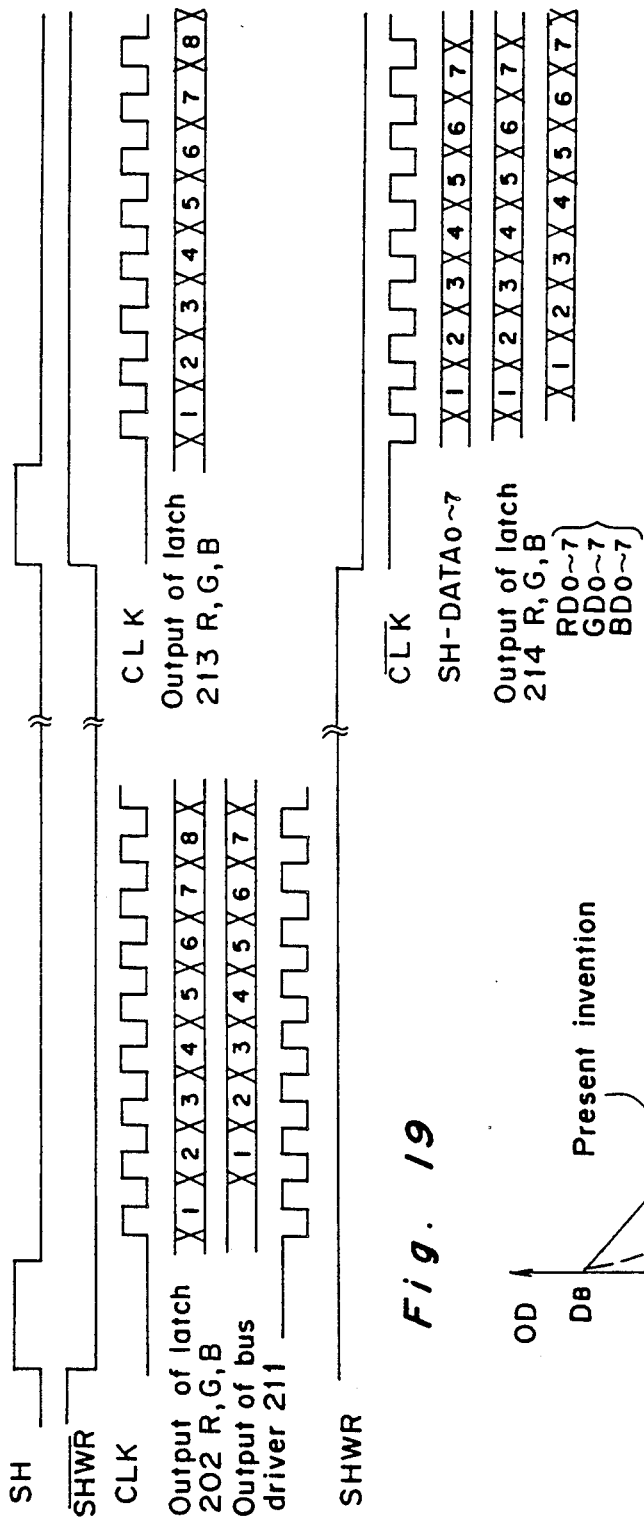
FIG. 18 is a timing chart for showing individual signals to be input and outputted from the shading correction circuit.

Next, shading distortion contained in image data is removed. FIG. 17 shows a block diagram of a shading correction circuit and FIG. 18 shows a time chart of the shading correcting circuit.

The correction is done as follow.

At first, the standard white pattern 7 of uniform density is read by CCD sensor 4 before starting a scan by the image reading apparatus and one line data of the pattern is stored in RAM 201. As standard or reference value to be stored in RAM 201, one line data of either one of three primary colors, for example $GC_{0\sim7}$ is used. In order for that, data $GC_{0\sim7}$ is recorded in a latch circuit 202G once and, then, is stored, via a bus driver 204, into RAM 201.

The reason why one color data is used is to reduce the volume of RAM 201.

The standard data $SH\text{-}DATA_{0\sim5}$ stored in RAM 201 is read out with respect to each one scan line and is input to each address terminal of converting ROMs 212R, 212G and 212B for the shading correction.

Each of R, G and B image data $RC_{0\sim7}$, $GC_{0\sim7}$ and $BC_{0\sim7}$ is latched in each of latch circuits 213R, 213G and 213B and, further, each of latched image data is latched in each of latch circuits 214R, 214G and 214B in order to synchronize them with the standard data $SH\text{-}DATA_{0\sim5}$ Thereafter, they are input into individual data terminals of converting ROMs 212R, 212G and 212B, resepctively.

In each of converting ROMs 212R, 212G and 212B, a table for the shading correction is memorized beforehand. This table gives a corrected value in accordance with respective dissolved color picture element data and standard data corresponding thereto Output data from each of converting ROMs 212R, 212G and 212B is latched into corresponding latch circuit 215T, 215G or 215B in synchronous with clocks CLK and, then, outputted as corrected data $RD_{0\sim7}$, $GD_{0\sim7}$ or $BD_{0\sim7}$ therefrom.

In the shading correction circuit, a first-in-first-out (FIFO) memory is used for the RAM 201 for storing standard data. FIFO memory is a memory having dual ports which do not need any address. Input data and output data are input and outputted thereinto in synchronous with RCK and WCK, respectively and data to be read out is outputted in the order of writing thereof. Since FIFO memory does not need any address and, a counter for generating addresses and an address selector for switching from a writing address to a reading address and vice versa can be abbreviated advantageously.

Further, FIFO memory is easy to control since writing and reading data can be done parallel.

Data to be stored into each of converting ROMs 212R, 212G and 212B is determined as follows.

Each data OD with respect to R, G and B image signal data X obtained by digitalizing each output data of CCD sensor which is obtained when it reads a monochromatic document is given by the following equation.

$$OD = -\log \frac{(256 - X) \cdot 10^{-DB} + X \cdot 10^{-DW}}{256}$$

This equation is introduced from the relation between the density of document OD and the reflection R ($OD = -\log R$). In the equation, DB is the reflection of black color and $B_W$ is the reflection of white color. Also, X is a value obtained by digitalizing each output data from CCD sensor 4.

Figure 19:
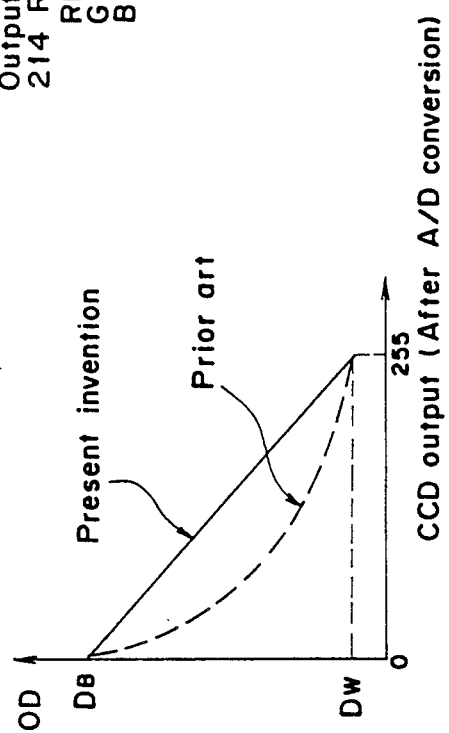
FIG. 19 is a graph for showing data for the shading correction to be used in the present invention.

This relation is shown in FIG. 19 by a dotted curve. However, if the binarization of image data is done according to the dither method with use of the corrected value OD, space between adjacent threshold values in a dither matrix becomes uneven and becomes narrow in the area of low density. Accordingly, the quality of image is worsened in the area of high density.

In order to solve this problem, correction data capable of converting image data X into OD so as to satisfy the relation $$OD = - \frac{D_B - D_W}{256} \cdot X$$

are prepared and stored in each of converting ROMs 212R, 212G and 212B. In FIG. 19, this linear relation is shown by the solid line.

When these correction data are used, not only the shading correction but also so called $\gamma$ correction are executed at the same time. Therefore, the binarization according to the dither method in the half-tone processing circuit can be done at a high precision.

Further, binary output signals of three primary colors R, G and B can be converted to cyan, magenta and yellow image data without any correction.

Signals SHWR and CLK for the conversion are given by CPU 40.

The preferred embodiments described herein are illustrative and not restrictive, the scope of the invention being indicated by the appended claims and all variations which come within the meanings of the claims are intended to be embraced herein.

What is claimed is:

1. An image reading apparatus having
   an image reading means for line scanning an image of a document to output an analogue image signal, said image reading means including a line sensor which is comprised of plural line image sensor chips being aligned along the lengthwise direction of said line sensor, each of said plural line sensor chips including a plurality of image sensing devices being arranged linearly and having an output terminal for outputting an analogue image signal which includes output signals from said image sensing devices;
   plural analogue to digital conversion means for converting analogue image signals obtained by said line sensing chips into digital image signals, respectively, each of which is connected to respective output terminals of said plural line sensor chips;
   plural memory means for memorizing digital image signals transformed by said analogue to digital conversion means each of which is provided for each of said line sensor chips;
   driving means for respectively driving said plural line sensor chips at the same time and for outputting the analogue image signals belonging to one scan line to said analogue to digital conversion means, whereby said plural analogue to digital conversion means respectively generate the digital image signals to said plural memory means;
   output means for sequentially reading out said digital image signals from the respective memory means in order of alignment of said plural line sensor chips a main scanning direction whereby outputting serial digital image signals belonging to the one scan line.

2. An image reading apparatus as claimed in claim 1 wherein said line sensor chip is a CCD line sensor chip.

3. An image reading apparatus as claimed in claim 2, wherein respective adjacent CCD line sensor chips are arranged parallel with respect tot he main scanning direction of said image reading means and apart form each other by a distance of a predetermined number of scan lines in a subscanning direction of said image reading means, and said driving means compensates outputting timings of the image signals in accordance with the distance in the subscanning direction so as to output image signals on the same scan line from said CCD line sensor chips at the same time.

4. An image reading apparatus as claimed in claim 3, wherein each of said CCD line sensor chips has plural line shift gates and said driving means applies pulse signals to said line shift gates at timings different from each other.

5. An image reading apparatus as claimed in claim 4, wherein each of said plural memory means provides first and second memory areas each having an area for memorizing one line data of each CCD line sensor chip and each said memory means is controlled so as to read image signals from either one of said first and second memory areas when image signals are written into the other memory area.

6. An image reading apparatus having
an illuminating means for illuminating a document;
an image reading means for reading an image of the illuminated document by transducing the light reflected form the document into electric signals, said image reading means being comprised of plural CCD line sensor chips arranged in a main scanning direction each of which has a signal output terminal;
a scanning means for line scanning said document by moving said document and image reading means relatively in a subscanning direction;
a driving means for respectively driving said CCD line sensor chips at the same time to output analogue image signals from respective signal output terminals of said plural line sensor chips;
plural analogue to digital conversion means for converting analogue image signals into digital image signals each of which is provided for each CCD line sensor chip;
plural memory means for memorizing said digital image signals converted by said analogue to digital conversion means each of which is provided for each CCD line sensor chips; and
an output means for sequentially reading out said digital image signals one scan line from said plural memory means in order of alignment of said CCD line sensor chips at timings different from each other thereby generating serial digital image signal of one scan line.

7. An image reading apparatus as claimed in claim 6, wherein respective adjacent CCD line sensor chips are arranged parallel with respect to the main scanning direction of said image reading means and apart from each other by a distance of a predetermined number of scan lines in the subscanning direction of said image reading means, and said driving means compensates outputting timings of the image signals in accordance with the distance in the subscanning direction so as to output image signals on the same scan line from said CCD line sensor chips.

8. An image reading apparatus as claimed in claim 7, wherein each of said CCD line sensor chips has plural of line shift gates and said driving means applies pulse signals to said line shift gates at timings different from each other.

9. An image reading apparatus as claimed in claim 6, wherein each of said plural memory means provides first and second memory areas each having an area for memorizing one line data of each CCD line sensor chip and each said memory means is controlled so as to read image signals from either one of said first and second memory areas when image signals are written into the other memory area.

10. An image reading apparatus comprising:
an image reading means for line scanning an image of a document to output an analogue image signal, said image reading means including plural line image sensor chips which are arranged in parallel with each other along a main scanning direction and apart from each other by a predetermined distance in a subscanning direction, each of said plural line sensor chips having a gate circuit which includes plural line shift gates;
plural analogue to digital convertors for respectively converting analogue image signals obtained by said line image sensor chips into digital image signals, each of which is connected to corresponding output terminals of said plural line image sensor chips;
plural memory means for memorizing digital image signals converted by said analogue to digital convertors each of which is provided for each of said line sensor chips;
driving means for providing a set of pulse signals to each of said gate circuits at the same time, one set of pulse signals for one gate circuit being different from the other set of pulse signals for the other gate circuit in timing in accordance with said predetermined distance in the subscanning direction, whereby the analogue image signals belonging to one scan line are respectively outputted from the output terminals of the line image sensor chips to the analogue to digital convertor; and
output means for sequentially reading out said digital image signals from the plural memory means in order of alignment of said plural line sensor chips in the main scanning direction whereby outputting serial digital image signals belonging to the one scan line.

11. An image reading apparatus comprising:
an image scanning means for line scanning an image of a document to output image signals, said image reading means including a plurality of line image sensors which are arranged in parallel with each other along a main scanning direction and apart from each other by a predetermined distance in a subscanning direction;
driving means for driving said line image sensors at the same time thereby causing said line image sensors to generate the image signals in different scan lines;
plural gate circuits which respectively correspond to said line image sensors for delaying outputting of the image signals generated from said line image sensors in accordance with said predetermined distance in the subscanning direction thereby outputting the image signals belonging to one scan line;

plural memories which corresponds to said gate circuits for storing said image signals outputted from said gate circuits; and reading means for sequentially reading out said image signals stored in said memories in order of alignment of said plural line sensors in the main scanning direction, thereby outputting serial image signals belonging to the one scan line.

12. An image reading apparatus comprising:

an image reading means for line scanning a color image of a document to output image signals which include at least a first signal corresponding to an image of a first color and a second signal corresponding to an image of a second color, said image reading means including a plurality of line image sensors which ar arranged in parallel with each other along a main scanning direction and apart from each other by a predetermined distance in a subscanning direction;

driving means for driving said line image sensors at the same time thereby causing said line image sensors to generate the image signals in different scan lines;

plural gate circuits which respectively correspond to said line image sensors for delaying outputting of the image signals generated from said line image sensors in accordance with said predetermined distance in the subscanning direction thereby outputting the image signals belonging to one scan line;

a plurality of first memories, each of which is provided so as to correspond to each of said gate circuits, for storing image signals of the first color among said image signals outputted from said gate circuits;

a plurality of second memories, each of which is provided so as to correspond to each of said gate circuits, for storing image signals of the second color among said image signals outputted from said gate circuits;

first reading means for sequentially reading out said image signals stored in said first memories in order of alignment of said plural line sensors in the main scanning direction, thereby outputting image signals corresponding to said plurality of line image sensors in serial as belonging to the one scan line; and second reading means, which operates in parallel with the operation of the first reading means, for sequentially reading out said image signals stores in said first memories in the order of alignment of said plural line sensors in the main scanning direction, thereby outputting image signals corresponding to said plurality of line image sensors in serial as belonging to the same scan line.

13. In an image reading apparatus, the apparatus comprising an image reading means for line scanning an image of a document to output image signals, said image reading means including a plurality of line image sensors which are arranged in parallel with each other along a main scanning direction and apart from each other by a predetermined distance in a subscanning direction, and a plurality of memories which correspond to said line image sensors, a method comprising steps of:

driving said line image sensors at the same time thereby causing said line image sensors to generate the image signals in different scan lines;

delaying outputting of the image signals generated from said line image sensors in accordance with said predetermined distance in the subscanning direction thereby outputting the image signals belonging to one scan line;

storing said image signals outputted from each of said fine image sensors in said memories in parallel;

sequentially reading out said image signals stored in said memories in order of alignment of said plural line image sensors in the main scanning direction, thereby outputting image signals corresponding to said plurality of line image sensors in serial as belonging to one scan line.

* * * * *

UNITED STATES PATENT AND TRADEMARK OFFICE
CERTIFICATE OF CORRECTION

PATENT NO. : 5,003,380

DATED : March 26, 1991

INVENTOR(S) : Yoshihiko HIROTA

It is certified that error appears in the above-identified patent and that said Letters Patent is hereby corrected as shown below:

ON THE TITLE PAGE

The following priority information is added:

[30]  Foreign Application Priority Data

July 2, 1987 [JP]    Japan ............... 62-167580

Signed and Sealed this

Twenty-eighth Day of July, 1992

*Attest:*

DOUGLAS B. COMER

*Attesting Officer*   *Acting Commissioner of Patents and Trademarks*